United States Patent [19]

van der Lely

[11] 4,090,571
[45] May 23, 1978

[54] SOIL CULTIVATING IMPLEMENTS
[76] Inventor: Cornelis van der Lely, 7, Bruschenrain, Zug, Switzerland
[21] Appl. No.: 703,267
[22] Filed: Jul. 7, 1976
[30] Foreign Application Priority Data
  Jun. 16, 1976   Netherlands ..................... 7508289
[51] Int. Cl.$^2$ ............................................. A01B 21/06
[52] U.S. Cl. ................................. 172/169; 172/175; 172/526; 172/739
[58] Field of Search .............. 172/526, 523, 59, 111, 172/522, 540, 169, 68, 739

[56] References Cited
U.S. PATENT DOCUMENTS

| 329,137 | 10/1885 | Campbell | 172/523 |
|---|---|---|---|
| 1,165,213 | 12/1915 | Stubblefield | 172/526 |
| 1,797,231 | 3/1931 | Herron | 172/526 |
| 2,699,023 | 1/1955 | Caldwell | 172/526 |
| 3,131,774 | 5/1964 | Lely | 172/526 |
| 3,138,208 | 6/1964 | Simms | 172/111 |
| 3,306,371 | 2/1967 | Bush | 172/540 |
| 3,774,688 | 11/1973 | Lely et al. | 172/68 |
| 3,943,999 | 3/1976 | Lely | 172/59 |

FOREIGN PATENT DOCUMENTS

| 628,635 | 3/1963 | Belgium | 172/526 |
|---|---|---|---|
| 390,273 | 4/1933 | United Kingdom | 172/526 |
| 379,225 | 6/1973 | U.S.S.R. | 172/526 |

Primary Examiner—Richard J. Johnson
Attorney, Agent, or Firm—Mason, Mason & Albright

[57] ABSTRACT

An implement preferably has elongated, stationary beams that extend horizontally transverse to the normal direction of travel. Staggered soil cultivating rotors are fastened to the beams at spaced apart locations and are ground driven to work closely adjacent strips of soil or a single broad path. Each rotor is freely rotatable about an upwardly extending shaft and has downwardly extending soil working members, such as tines, with lower active portions. Each active portion can have a lower outwardly directed part that, during rotation, describes a circle having a radius about equal to or less than the length of the active portion. The outwardly directed tine part increases ground contact and improves rotation. The rotors can be mounted in pairs; the rotors of each pair being angled from the vertical so that they rotate in opposite directions from one another. The beams can be turned to a limited extent to change the working positions of the rotors and a supporting roller can be interconnected to the beams at the rear thereof to regulate the working depths of the soil working members.

6 Claims, 5 Drawing Figures

SOIL CULTIVATING IMPLEMENTS

RELATED APPLICATIONS

Copending applications 612,003 and 612,004, now abandoned, filed Sept. 10, 1975 disclose power driven rotary soil working tool supports having radial arms and freely rotatable tine groups journalled at the ends of the arms. The tine groups can be turned in either direction upon striking the ground or an obstacle even while their supports are being rotated by driving means.

Copending applications 613,902, 613,903, now U.S. Pat. No. 4,044,839 and 613,885, now U.S. Pat. No. 4,042,042, filed Sept. 16, 1975 describe tine groups mounted on various supports that are also power driven, some supports being reciprocated to and fro.

BACKGROUND AND SUMMARY OF THE INVENTION

The invention relates to a soil cultivating implement comprising rotors having rigid cultivating tool members driven by ground contact and rotatable about upwardly extending axes. The operative portion of each member, usually a tine of the rotor, has a length at least about one times the radius of a circle described by the extreme point of the operative portion, a lower part of the operative portion being directed outwardly. With this construction a very intensive crumbling can be obtained with comparatively little energy expended, and the device is particularly suitable for working stubble-fields.

According to a further aspect of the invention, the soil cultivating implement comprises a plurality of tined rotors driven by ground contact and adapted to rotate about upwardly extending axes. These rotors each have tines with operative portions extending at least partly towards the ground and are spaced apart from the rotary axis. The operative portion is preferably provided with an extension. It is thus ensured that the rotors and tines will be driven with sufficient energy even under difficult conditions.

According to a third aspect of the invention, the implement comprises a group or pair of rotors arranged so that they rotate in opposite directions; they are arranged side by side in a row extending in a direction transverse of the direction of travel and are positioned to work closely adjacent or overlapping strips of soil. It has been found to be advantageous to locate the rotors so that a first row works a strip of soil overlapping a strip of soil worked by a second row located in front of or behind the first row, viewed in the direction of travel.

For a better understanding of the invention and to show how the same may be carried into effect, reference will be made by way of example to the accompanying drawings.

Figure 1:
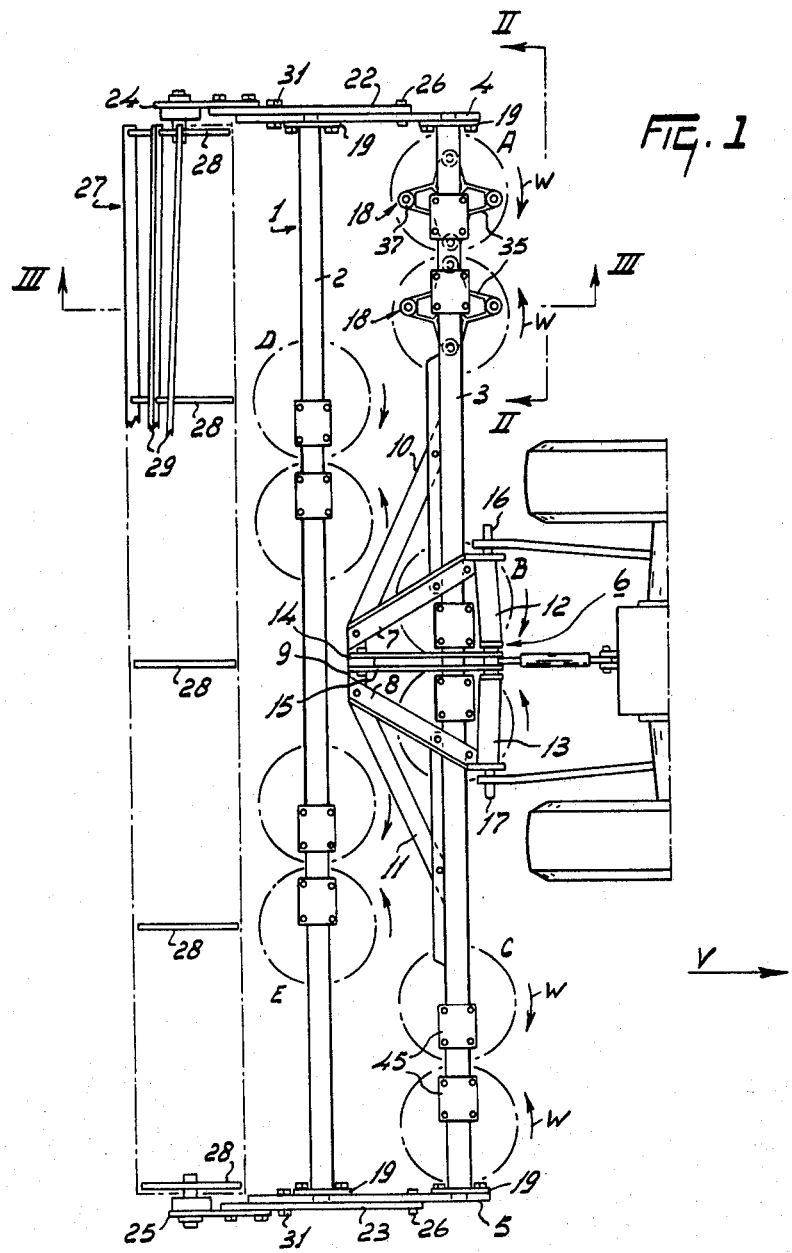
FIG. 1 is a plan view of the soil cultivating implement.

The soil cultivating implement comprises a frame 1 having two frame beams 2 and 3 extending transversely of the direction of movement V. The frame beam 3 is located in front of the frame beam 2, viewed in the direction of movement V. At their ends, the frame beams 2 and 3 are secured to side plates 4 and 5 respectively. The frame beam 3 is provided with a trestle 6, with the aid of which the device can be attached to the three-point lifting device of a tractor. The trestle 6 has two rearwardly converging beams 7 and 8, which coupled with a beam 9, extending transversely of the direction of movement and being located the level of the beam 3.

The beam 9 has secured to it, two supports 10 and 11 which are also connected with the frame beam 3. Near the frame beam 3, beams 7 and 8 have two upwardly extending struts 12 and 13, which are interconnected at their top ends where they have a point of attachment for the topmost arm of a three-point lifting deivyce. The two struts 14 and 15 are inclined away from said point of connection downwardly towards the beam 9 so that a firm attachment to the lifting device of the tractor is obtained. Near the lower ends of the struts 12 and 13, are located the two connecting points for the lower arms of the lifting device 16 and 17 which are also located near the frame beam 3. The frame beam 3 is provided with three groups of rotors 18 spaced apart from one another and designated by A, B and C respectively. The central group of rotors B is located beneath the trestle 6 and the supports 10 and 11 are constructed so that they engage frame beam 3 approximately midway the distance between two consecutive groups of rotors A,B and B, C respectively. Viewed in plan, the struts 12 and 13 are located above and substantially in line with the group of rotors B located at the center of the device.

While the frame beam 3 has three pairs or groups of rotors A, B and C, the frame beam 2 has two pairs or groups of rotors D and E. Viewed in the direction of travel, the group of rotors D is located centrally behind the groups of rotors A and B, whereas the group of rotors E is located centrally behind the groups of rotors B and C. The disposition is such that the groups of rotors work overlapping strips of soil and the implement as a whole cultivates an uninterrupted strip of soil.

Figure 3:
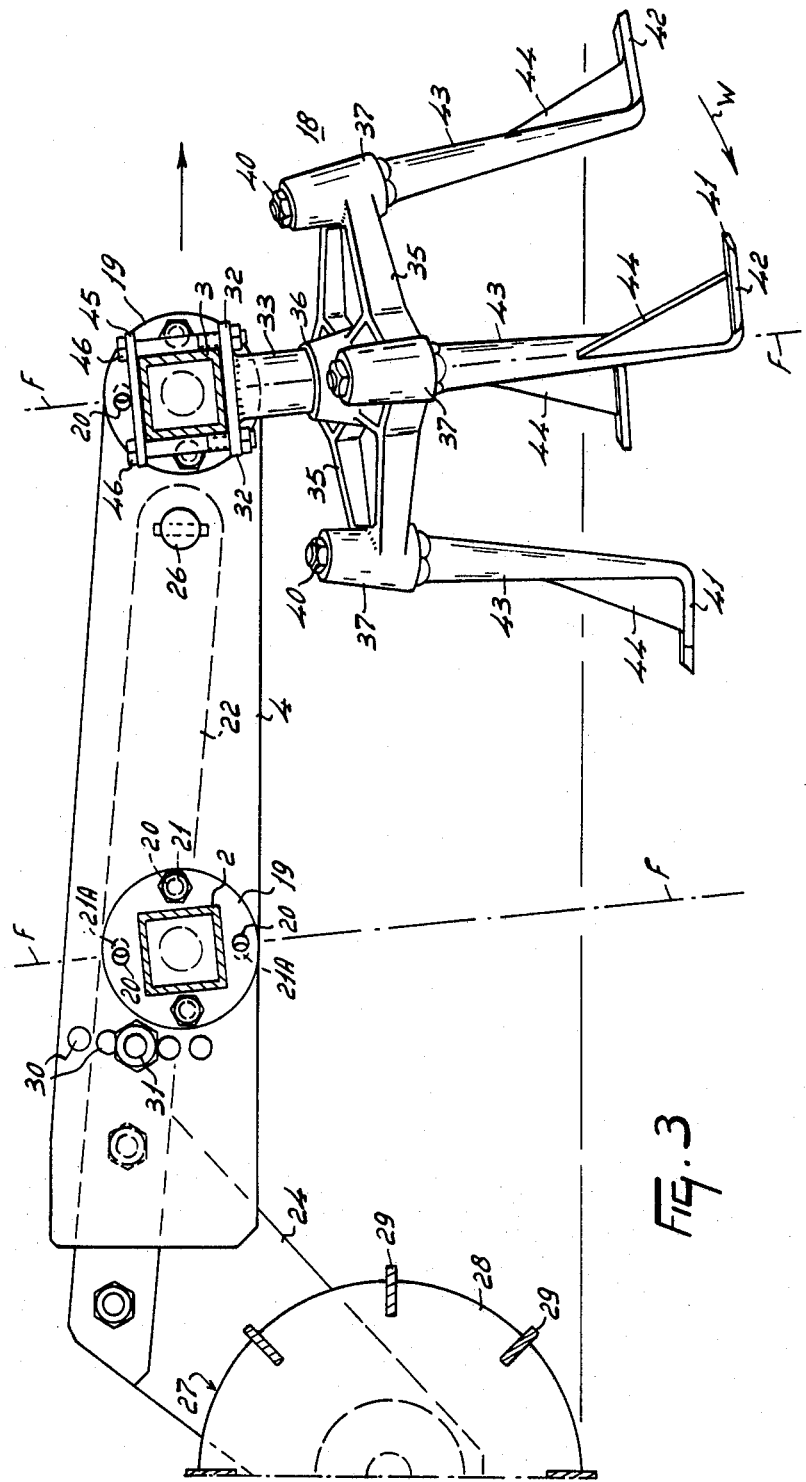
FIG. 3 is an enlarged sectional view in part, taken on the line III—III in FIG. 1.

FIG. 3 shows that the frame beams 2 and 3 are fastened to the side plates 4 and 5 and turnable about their longitudinal axes to any one of a plurality of settings. For this purpose, the frame beams 2 and 3 have plates 19 having holes 20 registering with two groups of holes 21 and 21A in the side plates 4 and 5 respectively. With respect to the holes 21A, the holes 21 are shifted through about 6°. The disposition is such that the frame beams 2 and 3 can be turned through an angle of at least 6° and be fixed in two positions. The side plates 4 and 5 are provided with arms 22 and 23 respectively having a downwardly inclined portion 24 and 25 respectively. The arms 22 and 23 are adapted to pivot about a shaft 26. The downwardly inclined portions 24 and 25 hold a roller 27, which serves as a crumbling roller. The roller 27 comprises a plurality of supporting plates 28, in this embodiment, five, and at the circumference of plates 28, strips 29 are fastened. In this embodiment the roller comprises eight strips of this kind. The strips extend helically, preferably covering an angle of 90°. The side plates 4 and 5 have holes 30 adapted to register with holes in the arms 22 and 23 so that these arms can be fixed in position by means of a bolt 31. This permits of adjusting the roller with respect to the frame 1 in a direction of height.

Figure 2:
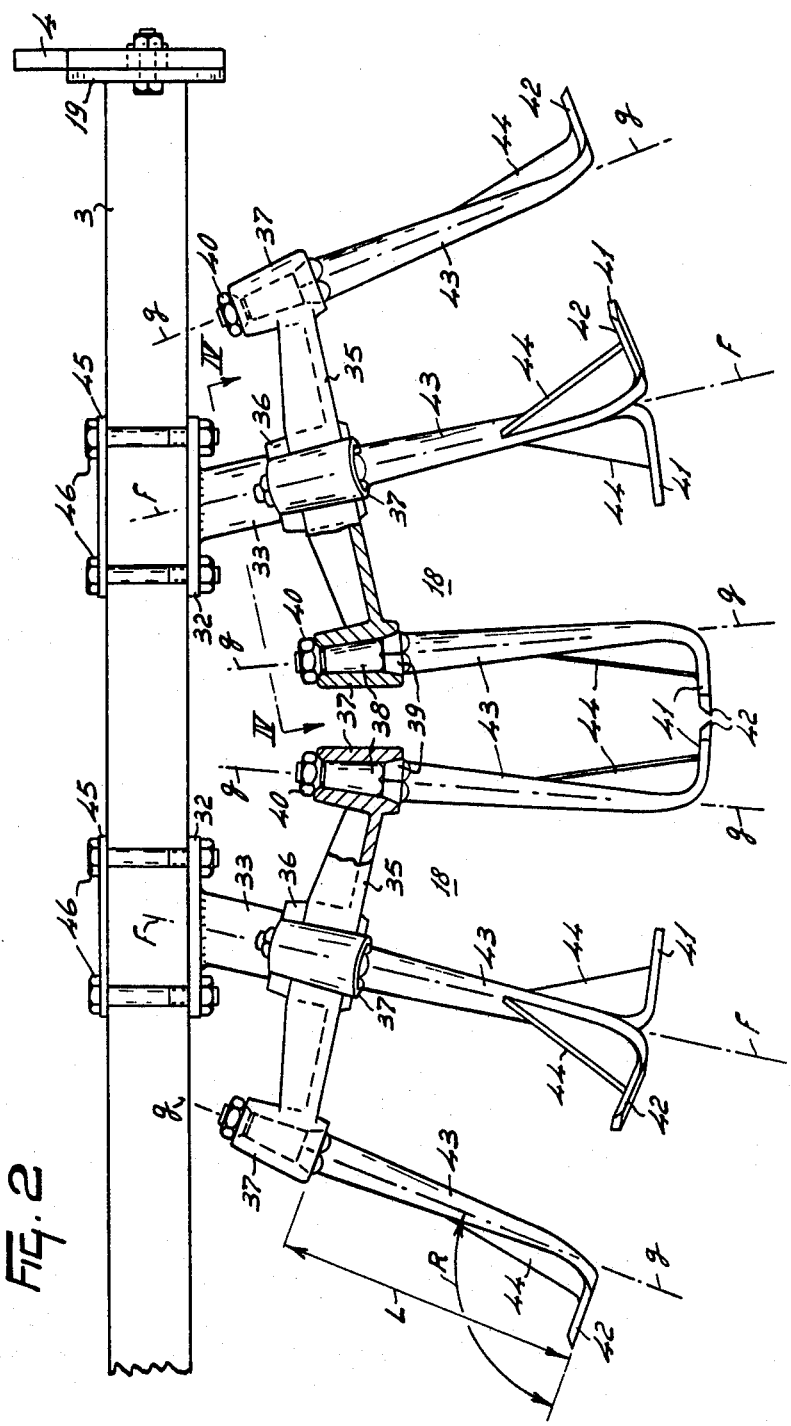
FIG. 2 is an enlarged front elevational view of a group of tines on the implement taken on the line II—II in FIG. 1.
Figure 4:
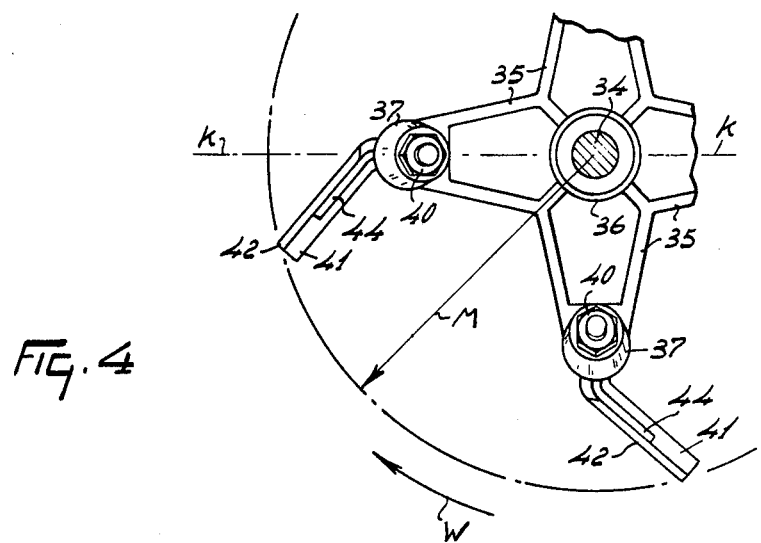
FIG. 4 is a plan view of a rotor taken on the lines IV—IV in FIG. 2.

FIGS. 2 and 3 show the fastening structure for the rotors 18. The rotors have each a plate 32 provided with an arm 33. At its end the arm 33 has a stub shaft 34 having an axis $f$—$f$ (FIGS. 2 and 4). The rotor 18 is freely rotatable about said stub shaft. The rotor 18 comprises four arms 35 fastened to a hub 36. The arms 35 have sleeves or holders 37 at their ends for receiving cultivating tools that are rigid tines. The sleeves 37 have center lines $g$—$g$ preferably located in a conical plane, the vertex of which is located on the center line $f$—$f$ of the stub shaft. The apex of the cone is about 15°. The tines each have a fastening portion 38 by means of which they are secured in the sleeves or holder 37 of the rotors. This fastening tine portion 38 has a hexagonal fitting side 39, which fits in a hexagonal side of the sleeve 37. The fastening portion 38 has, in known manner, a screw-thread at the top for receiving a fixing nut 40. The operative portion of the tine joins the fastening portion.

On the lower side the active or operative portion has an outwardly bent over part 41. This outwardly bent over part 41 is flat in this embodiment and has a cutting edge 42. FIG. 4 shows that, viewed in the direction of the rotary axis the lowermost part 41 of the cultivating member is directed to the rear in the direction of rotation. The lowermost part 41 is at an angle of preferably 45°, in this embodiment 50°, to a radial line $k$—$k$ going through the junction point of the upper operative portion and the lowermost part. The lowermost part 41 is flat and has a width corresponding to the width of the lowermost portion of the part joining said operative portion and directed downwardly away from the fastening portion 38. The downwardly extending, operative part 43 has a tapering shape (see FIG. 2) and the outwardly extending, operative portion is at a angle R of about 90°, in this embodiment, to the upper operative part. The bottom side of the outwardly extending part 41 is at a small angle - in this embodiment about 8° - to a plane at right angles to the rotary axis $f$—$f$. This part preferably has a length of about 10 cms and a width of 2 cms, the thickness being 0.8 cm. The rotor comprises a small number of these cultivating members or tines, and in this embodiment four such members are employed.

Between the upwardly extending, operative part 38 and the outwardly extending, operative part 41, an extension 44 is provided. In this embodiment the extension 44 is triangular, the base thereof being secured to the outwardly extending, operative part; its length slightly exceeds half the length of the outwardly extending, operative part 41. The height of said extension is considerably larger than the base; in this embodiment it is twice that dimension. Viewed in the direction of the rotary axis, the extension 44 is substantially normal to a plane at right angles to said rotary axis $f$—$f$. The length L of the operative portion of the cultivating member is approximately equal to or larger than the radius M at the point of the operative portion nearest the center line, that is to say, the point where the fitting side 39 terminates. In this embodiment the length L is substantially equal to the length of the radius M. The length of the outwardly extending, operative part is about 10 cms. The radius M of a rotor will preferably be smaller than 30 cms and in this embodiment it is about 15 cms.

In this embodiment, the center lines $g$—$g$ of the top parts 43 of the cultivating members are located in planes going through the rotary axis $f$—$f$ of the rotors. The rotor is secured by means of a top plate 45 and bolts 46, by which the plate 32 can be clamped against the frame beam 3. The setting of the stub shaft 33 can, if desired, be chosen so that the sleeves 37 of the rotors are as near as possible to one another, however, without engaging one another in operation. In this manner, the worked strips of soil join or overlap one another so that basically a pair of rotors can work an uninterrupted strip of soil. If desired, the distance between the rotors may be changed by loosening the bolts 46 and displacing the arms 32 inwardly or outwardly.

It should be noted that the distance between the frame beams 2 and 3 is about twice the radius M of the rotor, and the distance of the roller 27 from the rearmost row of cultivating members is equal thereto. The roller located behind the cultivating members comprises strips 29 of a height of about 5 cms. The roller has a diameter of less than 50 cms, in this embodiment about 30 cms. With devices of the kind comprising rotating cultivating members, it is common practice to use a roller having a central support, the frame of the roller itself being formed by a support at the center and a plurality of circular plates. However, in the present invention, the frame of the roller 27 is formed by a plurality of circular plates 28 and the strips 29 intended to work the soil. The number of strips is selected so that the roller is not likely to be filled with earth.

In operation, the device is drawn in the direction V and owing to the location of the rotors, the latter will rotate in the direction of the arrows W in FIG. 1 so that two rotors of the same group are rotating in opposite senses and the arrows at the front of the device face one another. The rigid tines provide an intense cultivation of the soil, while the roller with the strips 27 ensures a very effective crumbling. It is advantageous to use a roller with angular strips because the strips additionally contribute to the crumbling effect. It is noted that with soil cultivating implements having rotors rotated by their contact with the ground, the use of the roller is very important, since the effect of the tines is less vigorous than in the case of rotors driven mechanically, that is to say, driven by the power take-off shaft of a tractor. An advantage, however, is that this device requires less energy than a device comprising mechanically driven rotors. Driven rotors may be very useful under extremely troublesome conditions, whereas the device according to this invention is appropriate for cultivating kinds of soil which have to be crumbled up less vigorously, in particular breaking up hard lumps of earth not being primarily required or desirable. In accordance with the present invention the device can satisfactorily operate even if the soil contains stones.

It has been found that the cultivating members can be very successfully employed for superficial tilling of the land, particularly for working stubble-fields. The soil is not cultivated to the same depth as in the case of straight cultivating members, as will be described with reference to FIG. 5, but shallow cultivation is particularly suitable for killing weeds. The extensions 44 contribute to an important extent to enhance the rotation of the rotors and tools, particularly if crop residues are still present in the field. The outwardly extending, operative part 41 also contributes to a more intensive rotation of the rotors, while the cutting edges 42 considerably improve the penetration of the cultivating members into the soil. Since the soil to be cultivated is often of a very different nature, it is highly desirable, in accordance with the present invention, for the position of the rotors to be adjustable, which can be performed by turning the frame beams 2 and 3 about their longitudinal axes.

It has also been found that is is important for the tines not to be resilient but to be rigid instead. Moreover, it has been found that the rotors should have only a small number of these tines assembled to have a comparatively small diameter.

It should be noted that with the disclosed tines not only the outwardly extending part but also the upwardly adjoining operative part 43 has a useful function.

Figure 5:
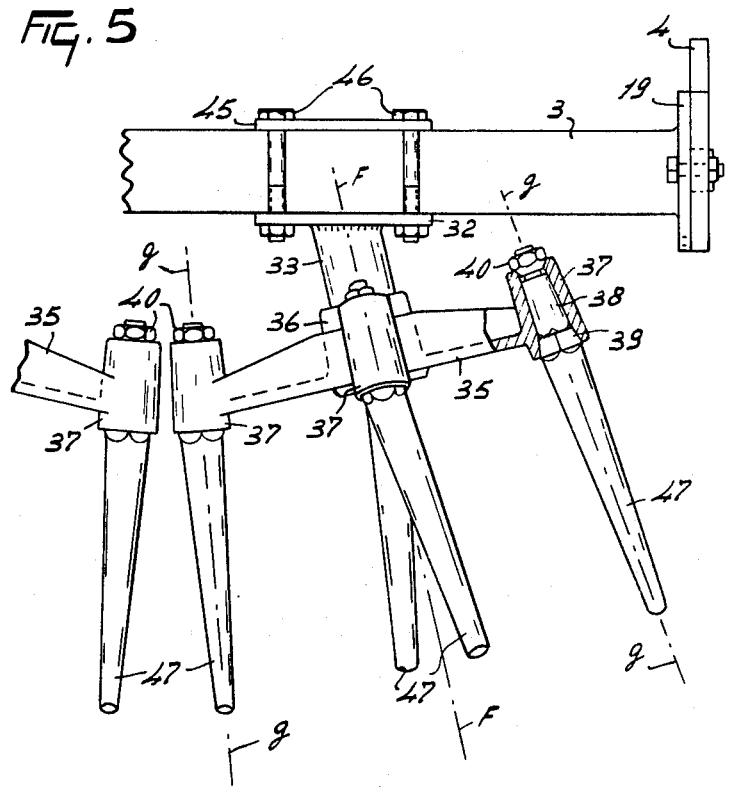
FIG. 5 is an enlarged front view of a second embodiment of a rotor.

FIG. 5 shows an embodiment having straight tines. The parts of these tines which correspond with those of the tines of FIGS. 1 to 4 are designed by the same reference numerals.

The cultivating members have a fastening portion 38 and a straight operative portion 47. The length of the operative portion is approximately equal to the radius M. The operative portion is tapering and extends in the same manner as the topmost parts of the cultivating members shown in FIGS. 1 to 4. These tines may be used for cultivation to a greater depth, it being then particularly important for the frame beams 2 and 3 to be adjustable so that the operation can satisfy the requirements in accordance with the kind of soil.

The invention is not restricted to the foregoing specific disclosure but also includes equivalents, whether described or not described.

I claim:

1. A soil cultivating implement comprising a frame having elongated frame beams that extend transverse to the direction of travel and a plurality of tined soil working members supported on said beams, said soil working members being arranged in a number of pairs on each of said beams and the beams being arranged one behind the other, with respect to the direction of travel of the implement, the soil working members of each pair being freely rotatable about corresponding upwardly extending axes and having tines positioned to work adjoining strips of soil, the axes of rotation of the soil working members of said pair converging in an upward direction when viewed from the rear, said soil working members being rotated responsive to contact of their tines with the ground and the soil working members of said pair being normally rotated in relative opposite directions, the pairs of soil working members on the forward beam being positioned to work strips of soil located between other strips of soil worked by the members on a rearward beam, each beam, together with respective pairs of soil working members, being independently turnable about the longitudinal axis of that beam and means fixing said beam in any of a plurality of chosen positions.

2. An implement as claimed in claim 1, wherein said pairs are spaced apart from one another at regular intervals.

3. An implement as claimed in claim 1, wherein an elongated roller is pivoted to said frame and located to the rear of said members, said roller extending transverse to the direction of travel and having a periphery comprised of elongated bars.

4. An implement as claimed in claim 3, wherein said roller is spaced from said members by a distance approximately equal to twice the radius of a path traced by a tine of a soil working member.

5. An implement as claimed in claim 1, wherein the ends of said beams are adjustably fastened to side plates of said frame.

6. An implement as claimed in claim 1, wherein said members each have a plurality of tines and the lower portions of said tines extend outwardly from the axis of rotation of the respective member.

* * * * *